(12) United States Patent
Nemish

(10) Patent No.: US 7,334,623 B2
(45) Date of Patent: Feb. 26, 2008

(54) TIRE MOUNTING AND DEMOUNTING BAR

(76) Inventor: Stephen C. Nemish, 312 Wynstay Ave., Valley Park, MO (US) 63088

( * ) Notice: Subject to any disclaimer, the term of this patent is extended or adjusted under 35 U.S.C. 154(b) by 0 days.

(21) Appl. No.: 11/460,563

(22) Filed: Jul. 27, 2006

(65) Prior Publication Data

US 2008/0023150 A1    Jan. 31, 2008

(51) Int. Cl.
*B60C 25/04* (2006.01)
(52) U.S. Cl. ........................................ 157/1.3
(58) Field of Classification Search ............... 157/1.3, 157/1, 1.17; 254/120, 131, 131.5, 131.1
See application file for complete search history.

(56) References Cited

U.S. PATENT DOCUMENTS

| | | | | |
|---|---|---|---|---|
| 3,584,672 A | * | 6/1971 | Duquesne | 157/1.3 |
| 5,265,661 A | * | 11/1993 | Tran | 157/1.3 |
| 5,806,578 A | * | 9/1998 | Gonzaga | 157/1.3 |
| 6,024,151 A | * | 2/2000 | Ochoa | 157/1.3 |
| 7,163,041 B1 | * | 1/2007 | Tran | 157/1.3 |
| 2004/0129388 A1 | * | 7/2004 | Brazil | 157/1.3 |

* cited by examiner

*Primary Examiner*—D. S. Meislin
(74) *Attorney, Agent, or Firm*—Charles McCloskey

(57) ABSTRACT

A manual tool has a handle with two opposite ends that mount and demount a tire from a wheel. The first end has a rounded rectangular head for inserting between the bead and rim, when demounting a tire from a wheel. The second end is at an angle to the first end and has two spaced apart and parallel round heads that also insert between the rim and the bead, for mounting a tire. The tool, when either end is engaged between a bead and a wheel, is rotated about the axis of the wheel to mount or to demount a tire. The first end and the second end are made of a material of lesser hardness than a wheel thus preventing marring of the wheel.

8 Claims, 6 Drawing Sheets

TIRE MOUNTING AND DEMOUNTING BAR

BACKGROUND OF THE INVENTION

The tire mounting and demounting bar generally relates to tire changing machinery and more specifically to a bar that pulls the tire bead from a wheel rim.

In bays and shops across the land, numerous tires are changed from wheels. Tires have tread that meets the road and sidewalls perpendicular to the tread. Tires have sidewalls upon both sides of the tire that extend partially towards the center, or towards a rim. At the innermost portion of the sidewall, the tire has an encased bead. The bead is a thickened portion of the sidewall surrounding metal wire. Now a wheel generally has two parallel and spaced apart rims upon its circumference. The rims have a greater diameter than the substantial portion of the tire's inner circumference.

Tire changing involves mounting a tire upon a wheel or removing a tire from a wheel. For mounting a tire upon a wheel, the wheel is clamped into a fixed position. One bead is placed over a rim as much as possible and then mechanical device manipulate the remainder of the bead over the rim. The beads are designed to remain a constant diameter when a wheel rotates as on a vehicle, or a motorcycle, even as it goes faster. The second bead undergoes the same procedure. Inflating the tire then seats both beads against their respective rims. For removing a tire from a wheel, the wheel is clamped again into a fixed position. The tire is partially deflated and then a mechanical device is inserted between a bead and a rim. The mechanical device stretches a small portion of the bead over the rim. Continuing to operate, the mechanical device then lifts the remainder of the bead over the rim. As before, the second bead undergoes the same demounting procedure.

Wheels are used on many vehicles. On utility vehicles, the appearance of wheels matters less so than on personal vehicles. For automobiles, motorcycles, and some boat trailers, the wheels and their appearance have high importance to their drivers. People often place great emphasis on the appearance of wheels as part of their self image. The after market in wheels of all kinds has enormous size. Often, people seek out shiny or novelty wheels to customize vehicles. In particular, motorcycles have shiny wheels including spokes and rims.

DESCRIPTION OF THE PRIOR ART

Traditionally, wheels, even shiny wheels, have been clamped for tire changing and other procedures. Once clamped in place, a typical tire can be changed manually using spoons. Spoons are long handled tools with a flat head, generally made of steel. The long handle provides the leverage to manipulate a portion of a bead onto and off the rim of a wheel. The flat head has a generally oblong planar shape, often hammered from the handle. The flat head is inserted between the bead and the rim to pull the bead from the rim in demounting and to push the bead onto the rim in mounting.

Prior art bars also have a hook end. The hook connects inside of the rim and the bight of the hook presses the tire sidewall downwardly for mounting of the tire. As a single point of contact, the hook presses a portion of the sidewall but does not reach the relief valley of the wheel to seat the bead. Once the flat head, or hook, has engaged the bead, the spoon is rotated around the rim to seat or to unseat the bead. As the typical spoon is steel, the spoon slides along the rim and abrades the rim surface. In time, the abrasions of the rim accumulate and discolor the finish of the rim or even cause rust upon ferrous rims.

The prior art has many spoons and tools to manipulate the bead of tires. However, the prior art shares the common disadvantage of marring the rim of a wheel. The handle and head of an existing steel spoon contact nearly the entire circumference of the rim upon both sides. Depending on wheel hardness, the spoon may mar the entire rim. Marring leads to discoloration, rust, and an unsightly appearance. For drivers and cyclists sensitive to the appearance of their wheels, marring is not acceptable.

The present invention overcomes the difficulties of marring a wheel during mounting and demounting of tires using manual tools at garages and small shops.

SUMMARY OF THE INVENTION

Generally, the present invention provides a handle with two opposite ends. The first end has a rectangular head with lobes for inserting between the bead and the rim when demounting a tire from a wheel. The second end is at an angle to the first end and has two spaced apart and parallel round heads that also insert between the rim and the bead but for mounting a tire. The first end and the second end are made of a material of lesser hardness than a wheel, such as polypropylene, so that marring of the wheel does not occur.

There has thus been outlined, rather broadly, the more important features of the invention in order that the detailed description thereof that follows may be better understood and that the present contribution to the art may be better appreciated. The present invention also includes tapered necks as supports behind the lobes at both ends, a plate supporting both heads of the second end, and riveted connection of the heads to the handle at the first end and the plate at the second end. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved tire mounting bar.

Another object is to provide such a tire mounting bar that engages and travels along a wheel rim without marring.

Another object is to provide such a tire mounting bar that moves around a wheel rim without power tools.

Another object is to provide such a tire mounting bar that inserts between a seated bead and a wheel rim, and then unseats the bead from the rim using the same head.

These together with other objects of the invention, along with the various features of novelty that characterize the invention, are pointed out with particularity in the claims annexed to and forming a part of this disclosure. For a better understanding of the invention, its operating advantages and

BRIEF DESCRIPTION OF THE DRAWINGS

FIG. 1a illustrates an end view of the first end;

FIG. 1b illustrates a side sectional view of the first end;

The same reference numerals refer to the same parts throughout the various figures.

DESCRIPTION OF THE PREFERRED EMBODIMENT

Figure 1:
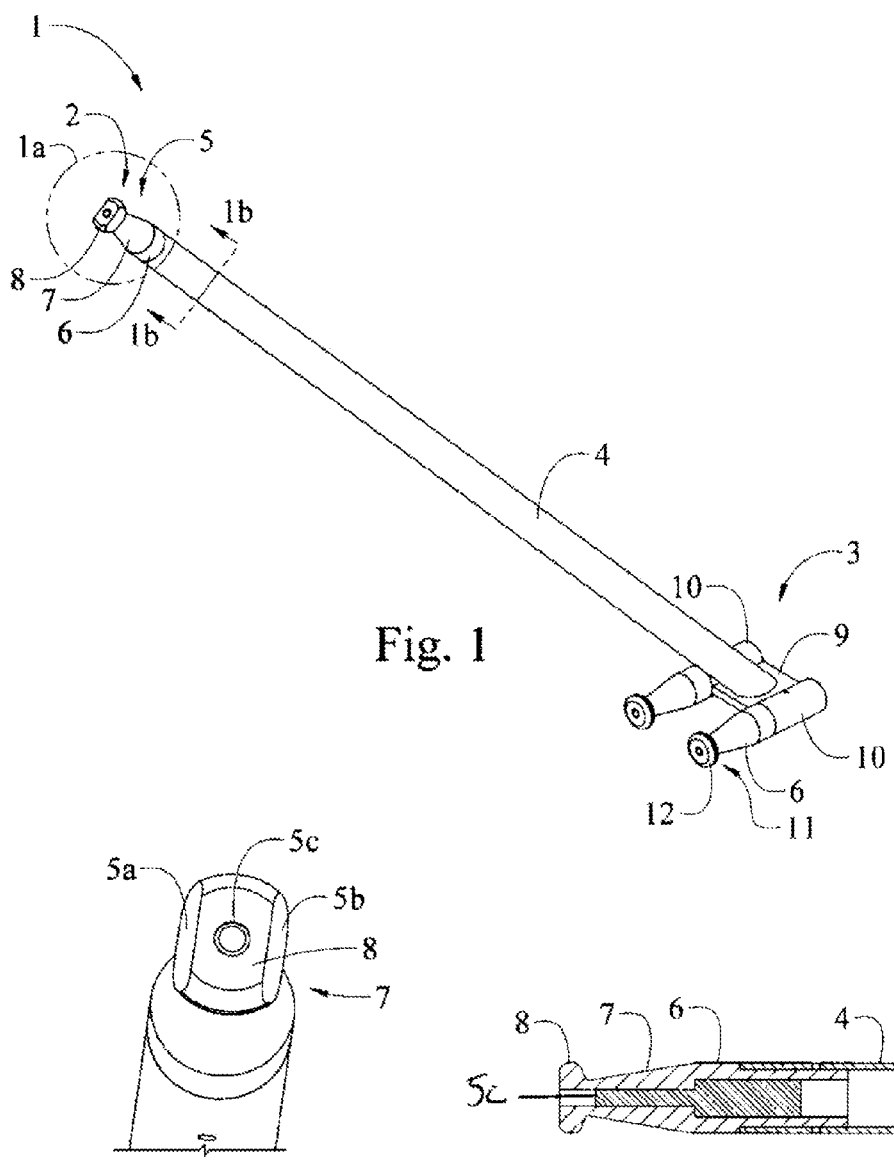
FIG. 1 shows an isometric view of the present invention.
Figure 4A:
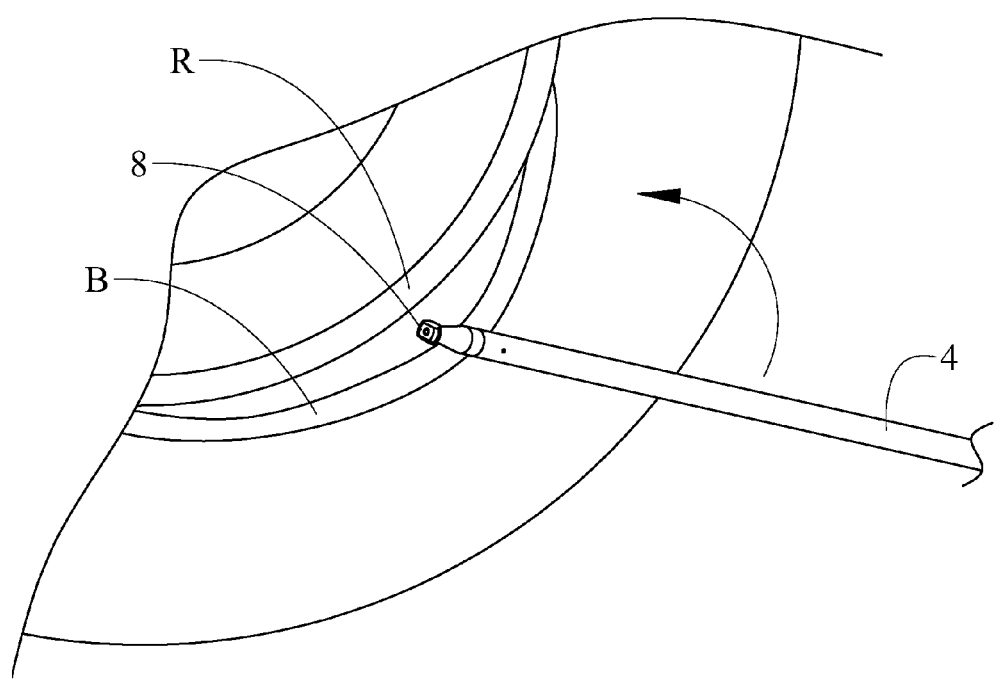
FIG. 4a illustrates partial section view of the present invention inserting the first end between a bead and the wheel rim to begin demounting a tire.
Figure 4B:
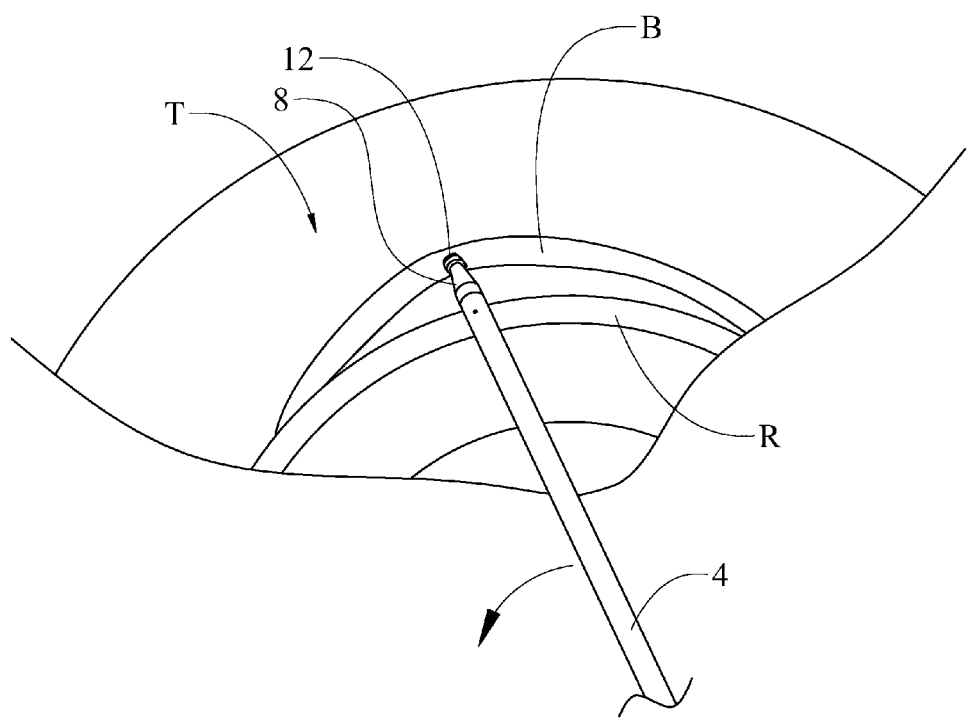
FIG. 4b illustrates a top view of the present invention turned over with the first end remaining between the bead and wheel rim as the handle is turned around the wheel to demount a tire; and, FIG. 5 illustrates a top view of the second end of the present invention inserting between the wheel rim and the bead for mounting a tire upon a wheel.

The present art overcomes the prior art limitations by providing a tool, with two heads, that mounts and demounts tires without marring a wheel. Beginning on FIG. 1, a tire mounting and demounting bar 1 has a generally linear shape with two opposed ends, a first end 2 and a second end 3, upon a cylindrical handle 4. The first end assists a mechanic in demounting a tire from a wheel without pneumatic or electric power. The first end has a neck 5 with a cylindrical base 6 that adjoins the handle. The neck extends away from the handle in a truncated cone 7 that constricts away from the handle. The cone constricts to generally half of the width of the handle where the first head 8 joins. The cone has a wedge like shape, as in FIG. 1a, to ease insertion of the first end between the bead and the rim later shown in FIGS. 4a, 4b. The first head has a generally rectangular shape with two mutually parallel and spaced apart straight longitudinal edges and two spaced apart lateral edges, each having a round lobe. The longitudinal axis of the first head is perpendicular to the longitudinal axis of the handle. FIGS. 4a, 4b later describe the function of the first head 8 during demounting of a tire by the first end 2.

FIG. 1a shows the head of the first end in more detail. The head 8 has a generally rectangular shape with two mutually parallel and spaced apart longitudinal faces 5a and two spaced apart rounded lobes between the faces 5a. The first head 8 has a somewhat rectangular shape with a lobe on both lateral ends. The head has the same diameter as the first end but a narrower width. The first head 8 joins to the neck as shown at 5. The neck is generally a truncated cone with the narrow top 5a abutting the first head and the wider base 5b located towards the handle. The neck has the same diameter as the handle. Behind the first head, the remainder of the first end appears as shown by 5b. The head retains partial rounding, as shown by 8, between the faces and opposite the handle. Centered upon the head 8, a core 5c stiffens the first end for rugged usage demounting tires from wheels. The first head has a length generally the same as the diameter of the first end. The width of the first head permits insertion of the first end between a tire bead and a wheel, as eased by the lobes.

FIG. 1b describes the connection of the first end to the handle. The first end has a head partially truncated here shown with the face 5a in the plane of the drawings. The remainder of the lobe of the head is rounded. The head joins to a conical neck 7 at the narrower diameter of the neck. The neck 7 widens, as shown at 6, to the diameter of the handle 4. The neck extends into a socket at the handle 4 proximate to the first end. The extension of the neck, in length, is approximately one hundred fifty percent of the diameter of the handle. The core 5c extends from the just behind the tip towards the socket 10 at a diameter of approximately one quarter inch. Where the conical neck joins the round portion of the head, the core steps to an increased diameter of approximately one half inch. The core continues partially through the embedment of the head within the socket. In the preferred embodiment, the neck is secured within the handle by a pin inserted through the diameter of the handle and through the neck. The core is stopped short of the passage for the pin, thus allowing for the pin to pass only through the material of the head and not the core. The extension, or embedment, of the head into the handle and the pin provide a strong and fixed connection of the first end to the handle during rugged usage.

Figure 5:
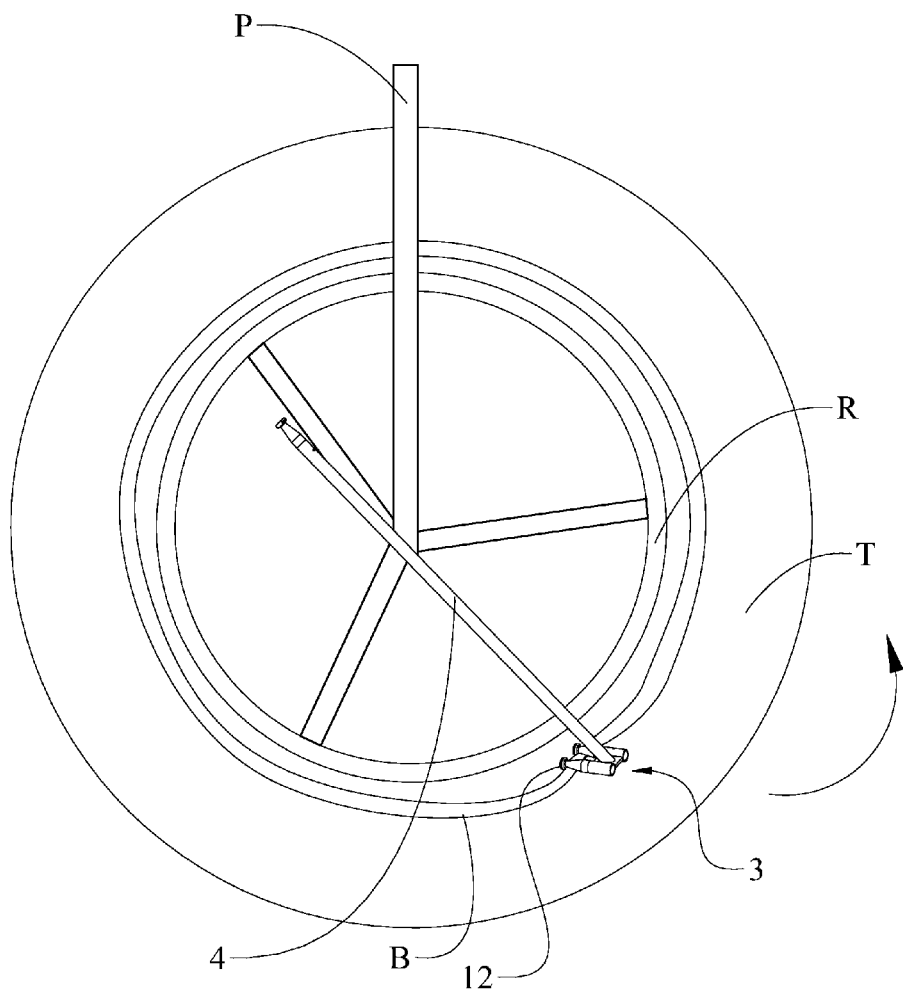

On the opposite part of the handle 4, the second end 3 assists a mechanic to mount a tire upon a wheel. The second end has a plate 9 centered upon and attached to the handle at an acute angle where the plate is rotated towards the first end 2. The plate has a generally rectangular shape with two mutually parallel and spaced apart longitudinal edges to each of which attaches a socket 10. Each socket is a tube generally of the same length as the longitudinal edge of the plate. The sockets are hollow and have a diameter similar to that of the handle. Defining the second end 3, a second neck 11 extends outwards from each socket, generally towards the center of the handle. Each second neck has a base, as shown at 6, that adjoins the socket 10. The second neck 11 extends away from the plate 9 in a truncated cone 7 that constricts towards the handle. The cone constricts to generally half of the width of the handle where the second head 12 joins. As before, the cone has a wedge like shape to ease insertion of the first end between the bead and the rim. The second head 12 is a generally rounded disc with a thickness generally one quarter that of the diameter of the handle. The second head has a similar diameter to the base. FIG. 5 later describes the function of the second heads 12 during mounting of a tire by the second end 3.

Figure 2:
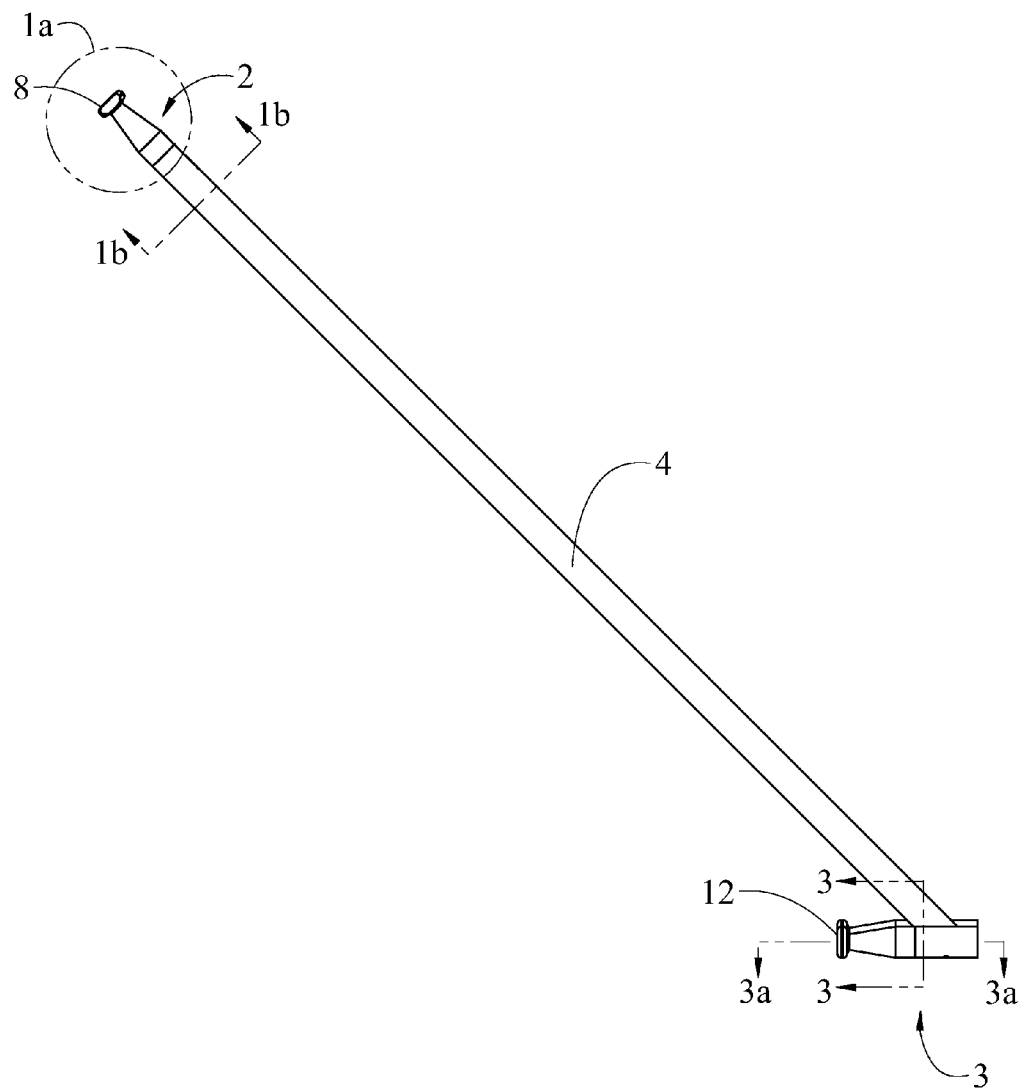
FIG. 2 shows a side view of the present invention particularly the first end and the second end.

FIG. 2 shows the present invention from the side with the second end 3 oriented horizontal, particularly the second heads 12. From the left, the first end 2 is coaxial with the handle 4. The first end terminates in the first head 8 which is perpendicular to the longitudinal axis of the handle. In this view, the flat side of the first head 8 is shown. The flat side is generally perpendicular to the longitudinal axis of the handle and to a line drawn between the two second heads 12. Opposite the first end, the second end 3 attains an acute angle to the handle 4 and a slight rotation away from the centerline of the handle. The acute angle is formed when the plate 9 is rotated towards the center of the handle and the second heads 12 towards the first end 2. This angle is selected to ease the insertion of the second heads between a tire and the rim, and then lifting of the handle bearing the sidewall of a tire, during mounting of same as later shown in FIG. 5. The angle and slight rotation accommodate the handle being to the side of fulcrum post.

Figure 3:
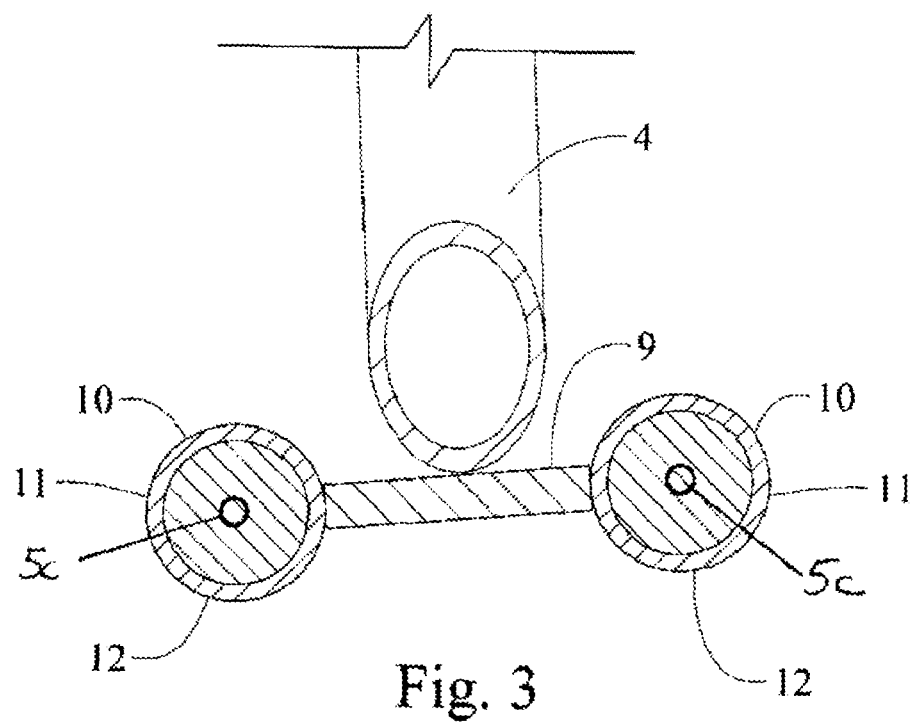
FIG. 3 shows an end view of the second end for demounting a tire.

The angled joint of the plate to the handle appears in FIG. 3. The plate 9 has a generally rectangular shape and a thickness much less than the diameter of a socket 10. The plate joins to the handle at an acute angle with the second heads 12 located towards the handle 4 as previously shown in FIG. 2. The flat sides of the first head 8 are generally perpendicular to the plate. The plate also joins to the handle at a slight cant, as the plate is rotated partially counterclockwise. The cant assists the insertion of the second end between a tire bead and a wheel rim during mounting of a tire as later described.

Figure 3A:
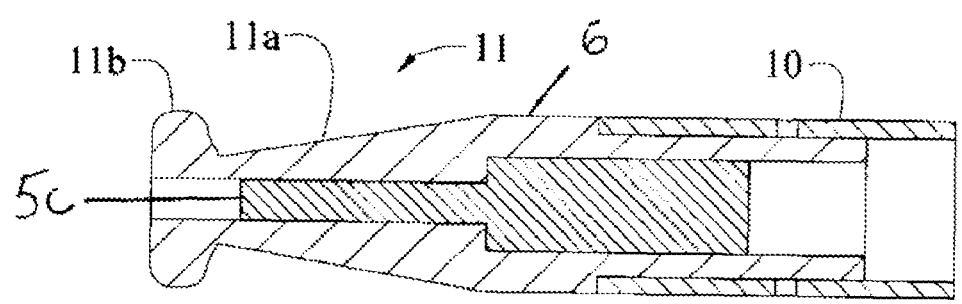
FIG. 3a illustrates a side sectional view of a head of the second end.

Turning the present invention, FIG. 3a shows a detailed view of the second end that has two second heads 12. The second heads are spaced apart and mutually parallel. Each second head is generally round with a rounded circumference to ease moving the second end around a wheel when mounting a tire. Each second head joins to a neck 11 shaped like a truncated cone. The top 11a of the neck has less diameter than the second head 12 while the opposite base of the neck has a diameter slightly less than that of the handle. Each neck 11 extends away from the second head and fits into a socket 10. The core 5c extends from just behind the tip towards the socket 10 at a diameter of approximately one quarter inch. Where the conical neck 11a joins the round portion of the head as at 6, the core steps to an increased diameter of approximately one half inch. The core then continues partially through the embedment of the head within the socket. Each socket is generally a hollow cylinder made of similar material as the handle. Each socket has a length at least 150% of the diameter of socket to provide a strong hold upon the neck. In the preferred embodiment, the neck is secured within the handle by a pin inserted through the diameter of the handle and through the neck. The core is stopped short of the passage for the pin, thus the pin passes only through the material of the head and not the harder core. A pin through the diameter of the socket and the neck makes for a strong and fixed connection of each second head during rugged usage. The preferred embodiment has two mutually parallel sockets spaced apart and joined to the longitudinal edges of a plate 9. Thus each end of the present invention serves a function for tire installation and removal.

When a tire, particularly a motorcycle tire, goes flat or a wheel requires replacement, the tire T is removed from the wheel. FIG. 4a shows the first step in removing a tire using the present invention. The first end 2 is positioned upon the bead B of a tire and just below the edge of the rim R of the wheel. The flat sides of the first head 8 are oriented tangent to the rim's edge as the first end is pushed between the rim and the bead. The neck, using wedge like action, ease placement of the first end. Once the first head is seated, a mechanic grasps the handle 4 near the second end 3, then rotates the first head ninety degrees to engage the lobes with the bead. The mechanic then raises the tire, particularly the bead, to the edge of the rim, and then flips the present invention 1 upwards and inwards so the second end passes over the center of the wheel. Doing this lifts and separates the tire bead B from the rim R of the wheel as shown in FIG. 4b. The first head catches on the rim and serves as a fulcrum. The narrow portion of the neck abuts the rim and imposes minimal stress on the rim, nearly eliminating marring of the rim. The worker then rotates and moves the first head around the rim to remove the tire from one side of the wheel. The worker repeats these steps to remove the tire from the other side of the wheel, completely separating a tire from the wheel without marring the rim.

After repairing a tire or for installing a new tire, a wheel is placed over a fulcrum post P. The post is generally centered through the wheel and is perpendicular to the wheel. Then the repaired or new tire T is placed over the post and upon the wheel as shown in FIG. 5. The bead B of the tire is placed upon the rim of the wheel. Then the second end 3 of the present invention is used by a mechanic to seat the tire bead inside of the wheel rim R. The second end is placed with the second heads 12 inside of the wheel rim where the rounded circumference of the lobes guides the bead towards the relief valley of the wheel. The sockets 10 ride upon the tire sidewall, and the bead is pressed downward and slightly outward from the second end. The acute angle of the plate places the handle generally flat and across the wheel, and perpendicular to the post P, used as a fulcrum when centered within the wheel. The acute angle of the plate increases the leverage developed by the mechanic to manipulate the bead. The mechanic places the handle 4 adjacent to the post and then pushes on the second head tangent to the rim. The handle often rests on the left side of the post as the mechanic pushes the second head counterclockwise around the post. The second end then advances around the rim pushing the bead outward slightly on the forward second head and guiding the bead into the relief valley of the wheel, generally using the rearward second head. The second heads prevent twisting of the handle and its subsequent binding upon the bead. Once the handle and second head are pushed around the rim, the bead is seated within the relief valley of the rim. The tire is then mounted upon the wheel and is ready for inflation.

From the aforementioned description, a tire mounting and demounting bar has been described. The tire mounting bar is uniquely capable of contacting and traveling upon wheels without marring them. The first head and the second heads are preferably made from polyethylene to prevent marring of wheels and have a metal core to provide strength and stiffness during rugged usage. The tire mounting bar and its various components may be manufactured from many materials, including but not limited to, polymers, polyvinyl chloride, high density polyethylene, polypropylene, nylon, steel, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device for aiding the removal and installation of a tire upon a wheel, said wheel having a rim and said tire having a bead, without marring said wheel, comprising:

an elongated handle having a first end and an opposite second end;

said first end having at least one first head, a neck extending coaxial from said handle, said first head joining to said neck opposite said handle and being perpendicular to the length of said handle;

said second end having at least two second heads, a plate, generally rectangular joining to said handle opposite said first end at an acute angle, at least two mutually parallel and spaced apart sockets upon the longitudinal edges of said plate, each of said sockets receiving a second head, said second head locating inwards and towards said handle; and, each of said second heads having a neck extending coaxial from said socket, said second head joining to said neck opposite said socket and the length of said socket is coplanar with said plate.

2. The tire removing and installing device of claim 1 wherein said necks have a truncated conical shape.

3. A device for aiding the removal and installation of a tire upon a wheel, said wheel having a rim and said tire having a bead, without marring said wheel, comprising:

an elongated handle having a first end and an opposite second end;

said first end having at least one first head, a rectangular shape, two mutually parallel lateral edges and two mutually parallel longitudinal edges perpendicular to said lateral edges, said lateral edges being round and said longitudinal edges being flat; and, said second end having at least two second heads, a solid cylindrical shape with a rounded circumferential edge.

4. A device for aiding the removal and installation of a tire upon a wheel, said wheel having a rim and said tire having a bead, without marring said wheel, comprising:

an elongated handle having a first end and an opposite second end;

said first end having at least one first head, a coaxial core, a neck extending coaxial from said handle, said first head joining to said neck opposite said handle and being perpendicular to the length of said handle; and, said second end having at least two second heads, each of said second heads having a coaxial core, a plate, generally rectangular joining to said handle opposite said first end at an acute angle, at least two mutually parallel and spaced apart sockets upon the longitudinal edges of said plate, each of said sockets receiving a second head, said second head locating inwards and towards said handle; and, each of said second heads having a neck extending coaxial from said socket, said second head joining to said neck opposite said socket and the length of said socket is coplanar with said plate.

5. A device for aiding the removal and installation of a tire upon a wheel, said wheel having a rim and said tire having a bead, without marring said wheel, comprising:

an elongated handle having a first end and an opposite second end;

said first end having at least one first head, a neck extending coaxial from said handle, said first head joining to said neck opposite said handle and being perpendicular to the length of said handle, said first head having a solid shape;

said second end having at least two second heads, a plate, generally rectangular with longitudinal edges and joining to said handle opposite said first end at an acute angle, two mutually parallel and spaced apart second heads upon the longitudinal edges of said plate, said second heads locating inwards and towards said handle; and, each of said second heads having a neck extending coplanar from said plate, joining to said neck opposite said plate and a round shape.

6. The tire removing and installing device of claim 5 further comprising:

said first head having a partially rectangular shape, two mutually parallel lateral edges and two mutually parallel longitudinal edges perpendicular to said lateral edges, said lateral edges being rounded and said longitudinal edges being beveled.

7. The tire removing and installing device of claim 5 wherein said first head, said second head, and said necks are made of a material that does not mar metal, said material is one of nylon, polypropylene, or polyethylene.

8. The tire removing and installing device of claim 5 further comprising said first head having a reinforcing core coaxial with said first head and said second heads each having a reinforcing core coaxial with each of said second heads.

* * * * *